United States Patent
Huang et al.

(10) Patent No.: US 8,196,036 B2
(45) Date of Patent: Jun. 5, 2012

(54) METHOD AND SYSTEM FOR CONVERTING HYPERTEXT MARKUP LANGUAGE WEB PAGE TO PLAIN TEXT

(75) Inventors: Tzu-Kuei Huang, Taipei (TW); Hong-Yang Tsai, Taipei (TW)

(73) Assignee: Esobi, Inc., George Town (KY)

( * ) Notice: Subject to any disclaimer, the term of this patent is extended or adjusted under 35 U.S.C. 154(b) by 1118 days.

(21) Appl. No.: 12/031,855

(22) Filed: Feb. 15, 2008

(65) Prior Publication Data
US 2008/0201633 A1 Aug. 21, 2008

(30) Foreign Application Priority Data

Feb. 16, 2007 (TW) ................................ 96106121 A

(51) Int. Cl.
*G06F 17/00* (2006.01)
(52) U.S. Cl. ...................................................... 715/239
(58) Field of Classification Search .................... 715/239
See application file for complete search history.

(56) References Cited

U.S. PATENT DOCUMENTS

| | | | |
|---|---|---|---|
| 6,654,758 B1 * | 11/2003 | Teague | 1/1 |
| 7,680,855 B2 * | 3/2010 | Hyder et al. | 707/710 |
| 2005/0050044 A1 * | 3/2005 | Takagi et al. | 707/6 |

OTHER PUBLICATIONS

Zhang, et al. ("Zhang"), "Automatic Extraction of Complex Web Data", PACIS 2006 Proceedings, Jan. 1, 2006, p. 1436-1449.*
Dean, et al., "Agile Parsing Techniques for Web Applications", 2005, p. 1-10.*

* cited by examiner

*Primary Examiner* — Amelia Rutledge
(74) *Attorney, Agent, or Firm* — Fox Rothschild, LLP; Robert J. Sacco

(57) ABSTRACT

A method for converting an HTML web page to plain text includes extracting from HTML source code of the HTML web page a portion containing a plurality of character strings and tags, calculating length and position of each character string in the extracted portion so as to find a first predetermined percentage of the character strings with the longest lengths, analyzing a number of position intervals between adjacent ones of the character strings belonging to the first predetermined percentage of the character strings with the longest lengths, labeling the corresponding character strings as belonging to a same block if the number of position intervals is not greater than a second predetermined value so as to find a largest character string block, and deleting the tags in the largest character string block so as to obtain main content of the HTML web page in plain text.

6 Claims, 5 Drawing Sheets

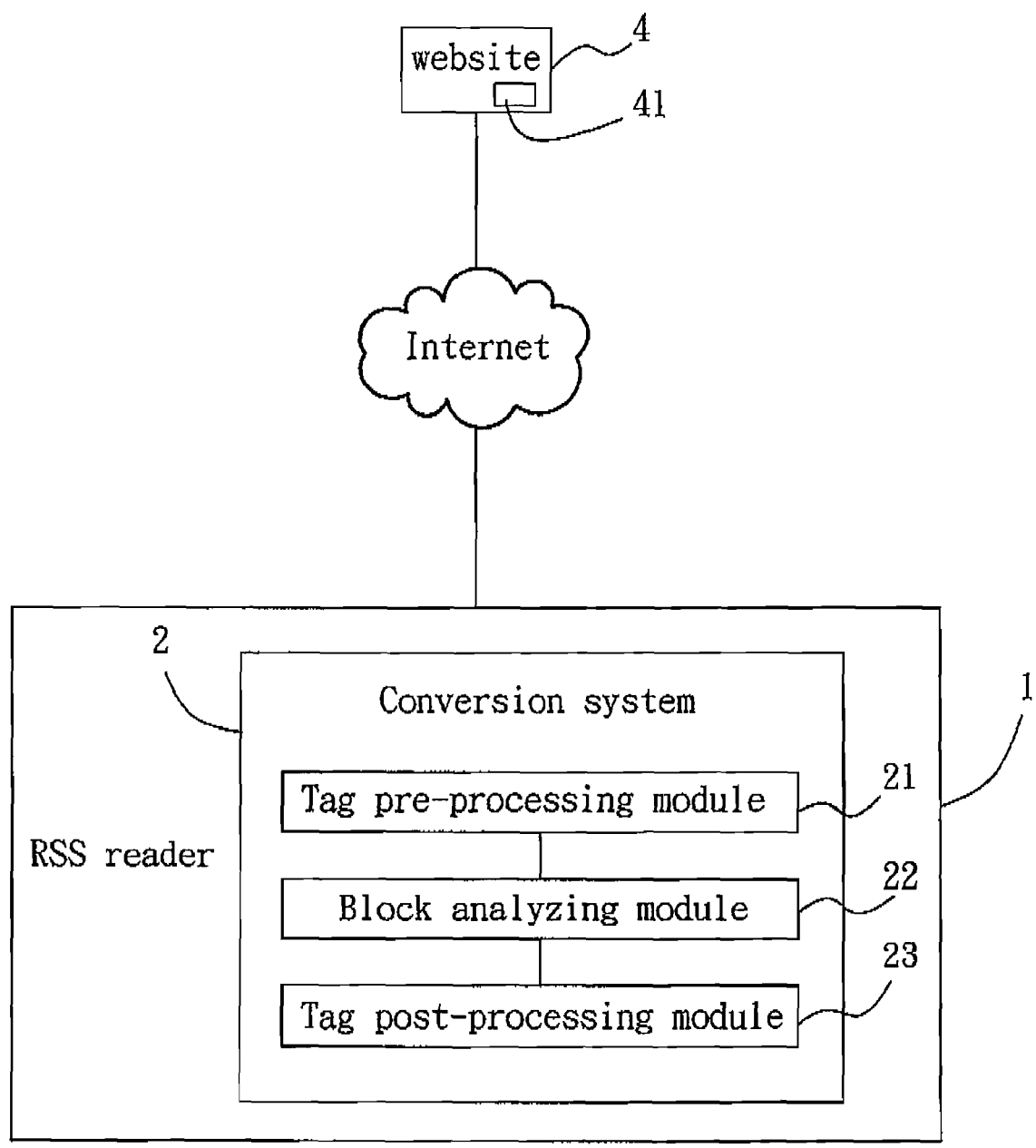
F I G. 1

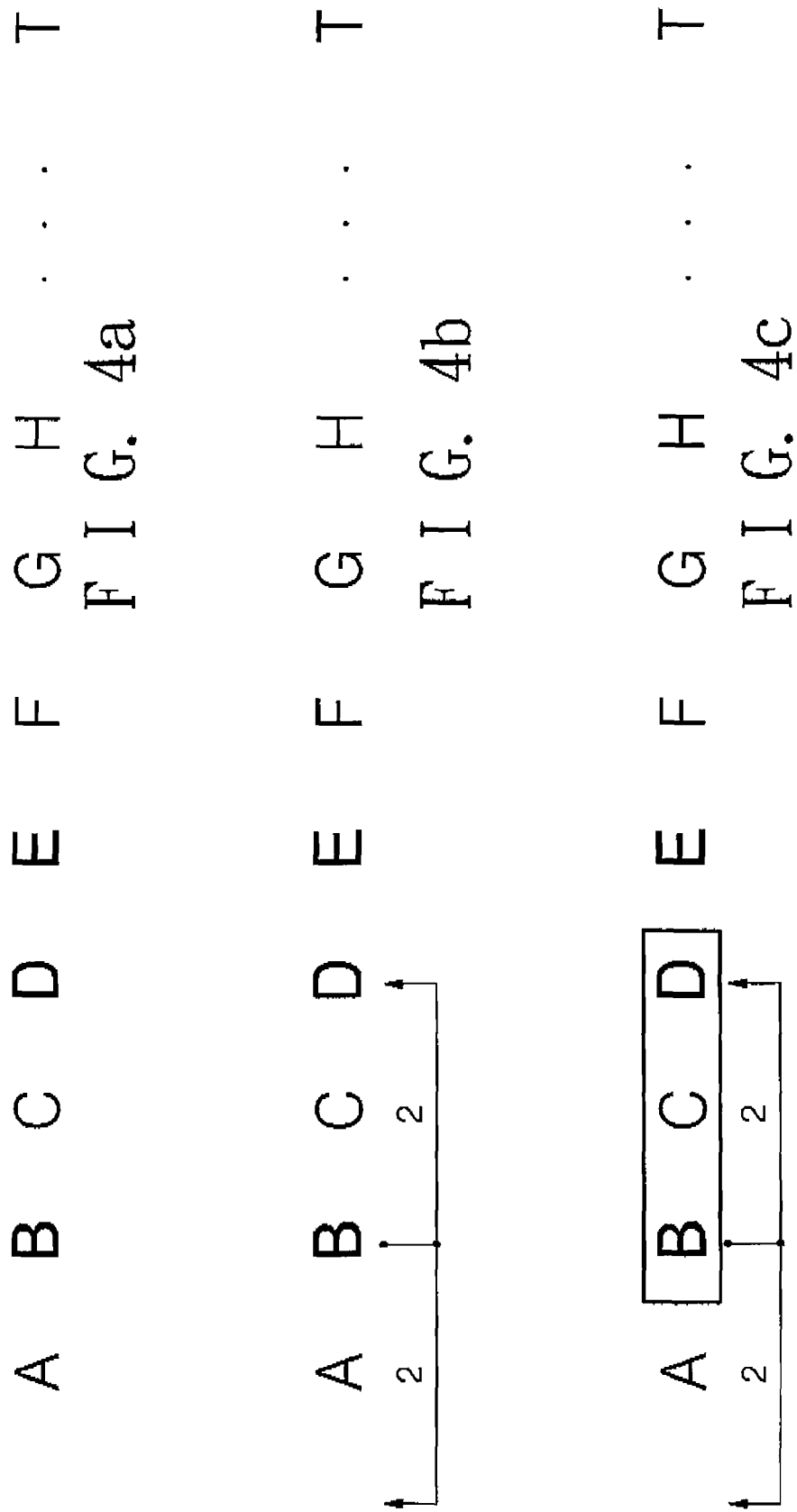

METHOD AND SYSTEM FOR CONVERTING HYPERTEXT MARKUP LANGUAGE WEB PAGE TO PLAIN TEXT

CROSS-REFERENCE TO RELATED APPLICATION

This application claims priority of Taiwanese Application No. 096106121, filed on Feb. 16, 2007.

BACKGROUND OF THE INVENTION

1. Field of the Invention

The invention relates to a method for converting web pages to plain text, more particularly to a method and system for converting Hypertext Markup Language web pages to plain text.

2. Description of the Related Art

With the popularity of the Internet, people have grown used to obtaining information and searching data through the Internet, like going directly to websites to browse web pages of news, articles, etc. At present, web pages are mostly written in the Hypertext Markup Language (hereinafter referred to as HTML).

Currently, there is available a new way of providing information on the networks, which is known as Really Simple Syndication (hereinafter referred to as RSS for short). RSS makes it possible for users to subscribe to information content of interest, and for the most recent information on web pages to be sent to subscribers in realtime. Specifically, to read RSS content, a user needs to install an RSS reader in a user terminal and then subscribe to various RSS feeds or channels provided by websites through the RSS reader. The RSS reader checks the subscribed RSS feeds regularly for updates, i.e., the RSS reader will automatically download summaries (including, e.g., a title, a description, and a URL or link) of latest content of news or articles on the subscribed feeds to the user terminal every user-determined time, so that the user can have updated information on the subscribed feeds in real time. If the user is interested in any new content or update, the user can click the corresponding summary to use the associated URL or link to connect to the corresponding HTML web page so as to browse the full text of the new content.

However, whether the user connects to a website directly to browse an HTML webpage or uses the RSS reader to browse the HTML web page, the HTML web page contains a lot of information (such as advertisements, caption links to other web contents, website information, etc.) irrelevant to the main content of the web page, which may affect the user's speed of reading the main content of the web page and which makes it difficult for the user to quickly comprehend the main content of the web page.

SUMMARY OF THE INVENTION

Therefore, an object of the present invention is to provide a method and system for converting an HTML web page to plain text so as to facilitate reading.

Another object of the present invention is to provide a method and system for converting an HTML web page to plain text, which can achieve HTML to text conversion with high precision.

Accordingly, the method for converting an HTML web page to plain text of this invention includes the following steps:

(A) receiving HTML source code of the HTML web page, the HTML source code including a plurality of character strings and a plurality of tags among the character strings;

(B) executing a tag pre-processing procedure to extract a portion of the HTML source code;

(C) calculating length and position of each of the character strings in the extracted portion of the HTML source code to find a first predetermined percentage of the character strings in the extracted portion with the longest lengths;

(D) analyzing a number of position intervals between each of the character strings belonging to the first predetermined percentage of the character strings with the longest lengths and another one of the character strings belonging to the first predetermined percentage of the character strings with the longest lengths, and labeling the corresponding character strings as well as any other of the character strings disposed therebetween as belonging to a same block if the number of position intervals is not greater than a second predetermined value so as to find a largest block of the character strings; and (E) deleting the tags among the character strings in the largest block thus found so as to obtain main content of the HMTL web page.

Accordingly, by processing the tags in the HTML source code of an HTML web page and by determining the location of the main content of the HTML web page from the lengths of the character strings and from the position intervals between adjacent ones of the character strings, the present invention can achieve precise extraction of the main text content of the HTML web page.

BRIEF DESCRIPTION OF THE DRAWINGS

Other features and advantages of the present invention will become apparent in the following detailed description of the preferred embodiment with reference to the accompanying drawings, of which:

FIG. 1 illustrates a preferred embodiment of an HTML to plain text conversion system according to the present invention, the HTML to plain text conversion system of the preferred embodiment being disposed in an RSS reader to receive a web page of a website;

FIGS. 4a to 4e illustrate how a pre-processed portion is processed by a block analyzing module.

DETAILED DESCRIPTION OF THE PREFERRED EMBODIMENT

Figure 2:
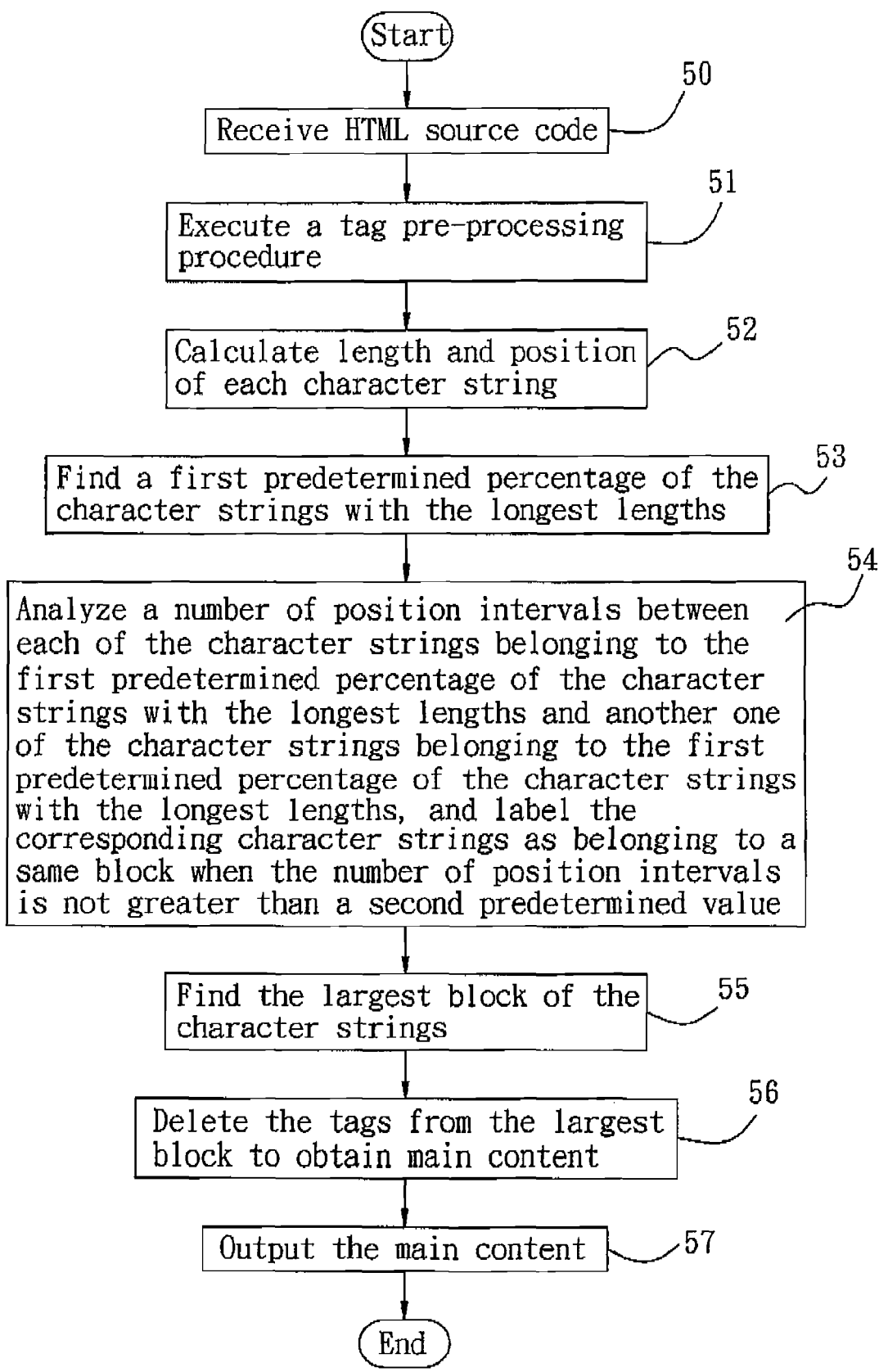
FIG. 2 is a flowchart of a preferred embodiment of a method for converting an HTML web page to plain text according to the present invention.

FIG. 1 illustrates the preferred embodiment of a conversion system 2 for converting an HTML web page to plain text according to the present invention. The conversion system 2 is used to convert a main content portion of HTML source code of an HTML web page to plain text. The conversion system 2 can be firmware or a program. The program may be pre-stored in a storage medium, such as an optical disk, for installation in and execution by an electronic device of the user. The HTML web page is provided by a website 4 constituted by one or more servers. The HTML web page is preferably a news web page or an article web page.

The conversion system 2 in this embodiment is integrated into a Really Simple Syndication Reader (hereinafter referred to as RSS reader) 1. The RSS reader 1 is installed in an electronic device connectable to the Internet, such as a computer. The website 4 provides at least one RSS feed 41 that can be subscribed to using the RSS reader 1. When the website 4 has a new HTML web page, the user can obtain a summary (including, e.g., a title, a description, and a URL or link) of the new HTML web page through regular checking of the RSS feed 41 using the RSS reader 1 so as to be aware of the availability of the new HTML web page in real time. If the user is interested in the content of the new HTML web page, the user can click or select the summary to connect to the website 4 so as to browse the full content of the new HTML web page. When the RSS reader 1 is connected to the HTML web page through the website 4, the HTML source code of the HTML web page will be downloaded for displaying the HTML web page on the RSS reader 1. The user can then set the conversion system 2 to convert the main content of the HTML web page to plain text through an operating interface (not shown) of the RSS reader 1. Thus, the main content of the HTML web page in plain text can be displayed for browsing by the user.

It is noted that the conversion system 2 of this invention may be integrated into other browsing programs that support HTML web pages, such as Internet Explorer, or integrated into the website 4, or utilized as an independent program, without being limited to the disclosure in this embodiment. Certainly, the RSS reader 1 in this embodiment further has basic components that other conventional RSS readers have, such as a control module for executing corresponding tasks in response to control commands from the user. However, as such components are well known to those skilled in the art and are not crucial features of the present invention, they will not be discussed herein for the sake of brevity.

The conversion system 2 in this embodiment acquires the main content of the HTML web page from the HTML source code. Since the HTML source code is constituted by text and tags, the HTML source code contains a plurality of character strings and a plurality of tags. Among the plurality of character strings, some may constitute the main content of the HTML web page, some may be used to define or explain the HTML web page and are irrelevant to the main content, some may be associated with advertisements, etc. The conversion system 2 in this embodiment includes a tag pre-processing module 21, a block analyzing module 22, and a tag post-processing module 23.

The tag pre-processing module 21 receives the HTML source code and performs a tag pre-processing procedure (to be described hereinafter) to process tags or white spaces in the HTML source code so as to extract a portion of the HTML source code which may be related to the main content of the HTML web page and which is sent to the block analyzing module 22. The extracted portion includes a plurality of character strings and a plurality of paragraph format tags among the plurality of character strings. The paragraph format tags define the interrelationships among the character strings in the extracted portion, e.g., the tags <p> and </p> mark the beginning and end of a paragraph formed from the character strings, and the tag <br> inserts a line break. Below is an example of an HTML document.

<html>
    <body>
    This is the body of the text.
    </body>
    </html>

As shown in the above examples in creating a web page using the HTML source code, the content inserted between the tags <body> and </body> is the body of the HTML web page, and the character strings related to the main content of the HTML web page will be placed in the body. For instance, if the HTML web page is a news web page, the character strings of the main content of a news article will appear in the body. Therefore, the tag pre-processing module 21 will extract a body portion of the HTML source code. The extracted body portion contains a plurality of character strings and tags. Many of the tags are irrelevant to the main content of the web page, and some of the character strings are used for commenting or definition purposes. Therefore, the tag pre-processing module 21 will delete the tags and character strings irrelevant to the main content from the extracted body portion.

Thus, the tag pre-processing module 21 in this embodiment further stores a first preset tag group having comment- and definition-related tag pairs, and a second preset tag group having HTML format-related tags which are related to the position, color, typeface, font, etc., of HTML elements, The first preset tag group includes the tags <script> and </script>, <style> and </style>, <!-- and -->, etc. The tag pair <script> and </script> is used to define a program language code. Therefore, the character strings between <script> and </script> may be associated with javascript program codes. The tag pair <style> and </style> is used to define format settings. Therefore, the character strings between <Style> and </style> may be associated with information describing the format of the HTML web page, e.g., typeface, font, color, pitch, etc. The tag pair <!-- and --> defines a comment that will not be displayed on the HTML web page. Therefore, the character strings between <!-- and --> are associated with comments.

The second preset tag group in this embodiment includes tags such as <font> which defines text font, size and color, <i> which defines italic text, <b> which defines bold text, <tt> which defines teletype text, <u> which defines underlined text, <strike> which defines strikethrough text, <sub> which defines subscripted text, <sup> which defines superscripted text, <pre> which defines preformatted text, <em> which defines emphasized text, etc. It should be noted that, although possibly relevant tags are preset in the first preset tag group and the second preset tag group in this embodiment, tags can be suitably added or deleted through subsequent updating of the contents of the first preset tag group and the second preset tag group.

Thus, when tags matching the first preset tag group are found in the extracted body portion, the tag pre-processing module 21 will delete the character strings between the matching tags as well as the matching tags. When tags matching the second preset tag group are found in the extracted body portion, the tag pre-processing module 21 will delete the matching tags. Furthermore, since there may be a plurality of sequences of white spaces present in the extracted body portion after deletion of the irrelevant character strings and the associated tags, the tag pre-processing module 21 in this embodiment converts each sequence of the white spaces to a single space so as to obtain a pre-processed portion for further processing by the block analyzing module 22, and transmits the pre-processed portion thus obtained to the block analyzing module 22.

Web page contents of news or blog articles in the conventional HTML source code generally consist of relatively long character strings, and the positions of these long character strings are usually very close to each other so that they can be collected to form a largest block. Therefore, the block analyzing module 22 will analyze the length and position of each character string in the pre-processed portion to locate a largest block. Subsequently, the tag post-processing module 23 will delete the paragraph format tags in the largest block thus located and output the main content of the web page in plain text to the RSS reader 1, which displays the same using a preset page format for browsing by the user.

The operational flow of the conversion system 2 will now be described in the succeeding paragraphs with reference to FIG. 2. The functions of the tag pre-processing module 21, the block analyzing module 22, and the tag post-processing module 23 will become apparent from the following description.

Initially, in step 50, the tag pre-processing module 21 receives HTML source code of an HTML web page, and executes a tag pre-processing procedure in step 51 to extract a portion of the HTML source code that is related to the main content of the web page and to send the same to the block analyzing module 22. After the tag pre-processing procedure (i.e., step 51) is ended, the flow goes to step 52.

Figure 3:
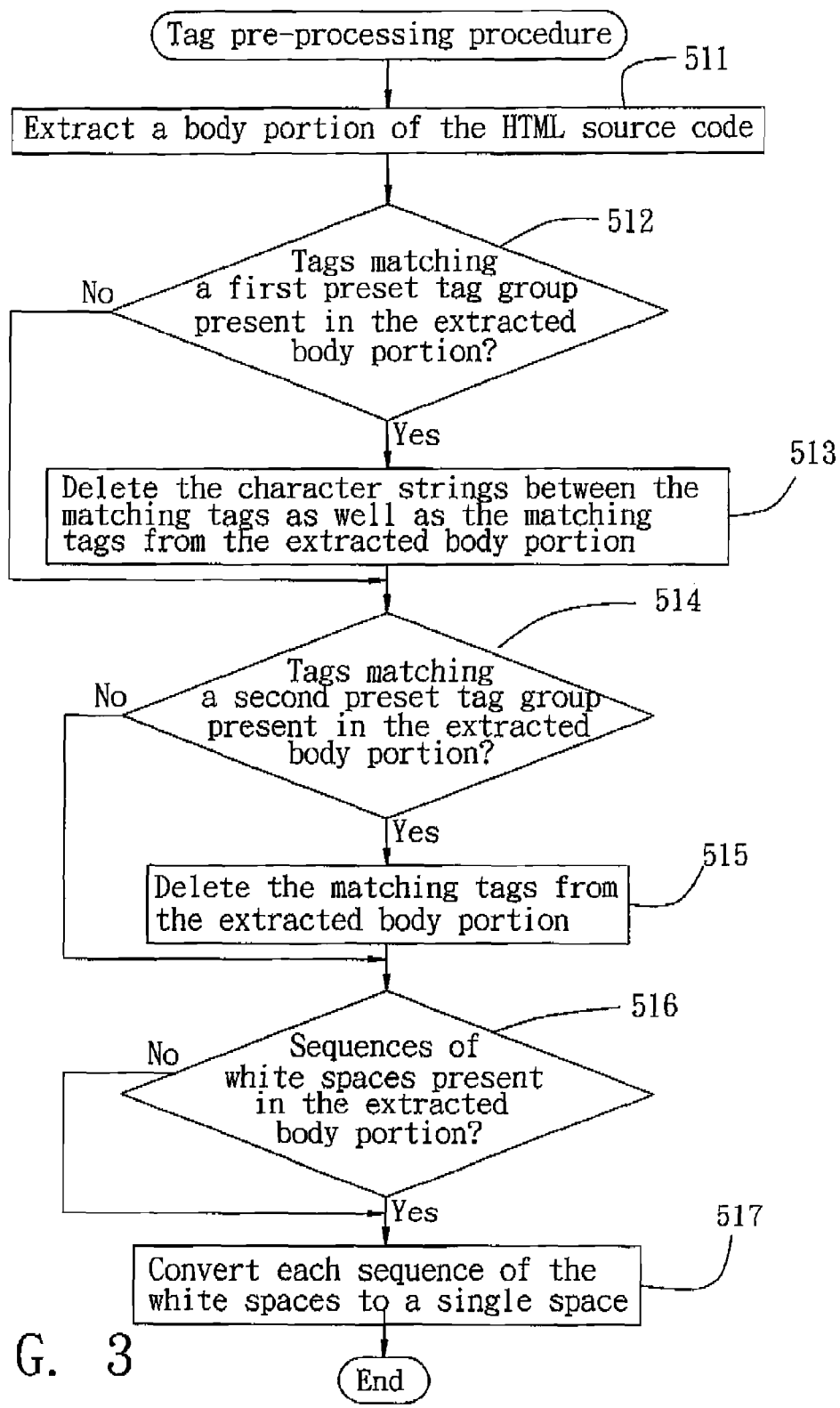
FIG. 3 is a flowchart to illustrate a tag pre-processing procedure in the preferred embodiment.
Figure 4D:
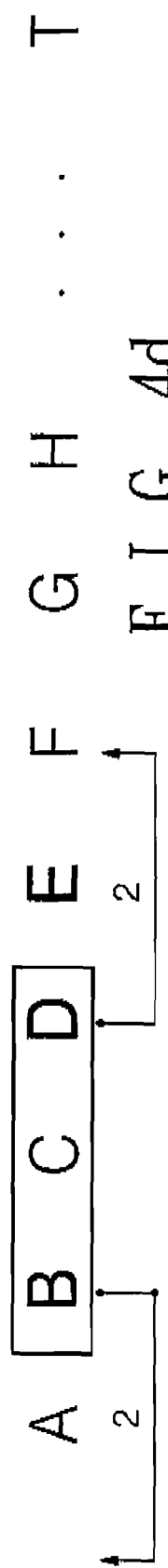
Figure 4E:
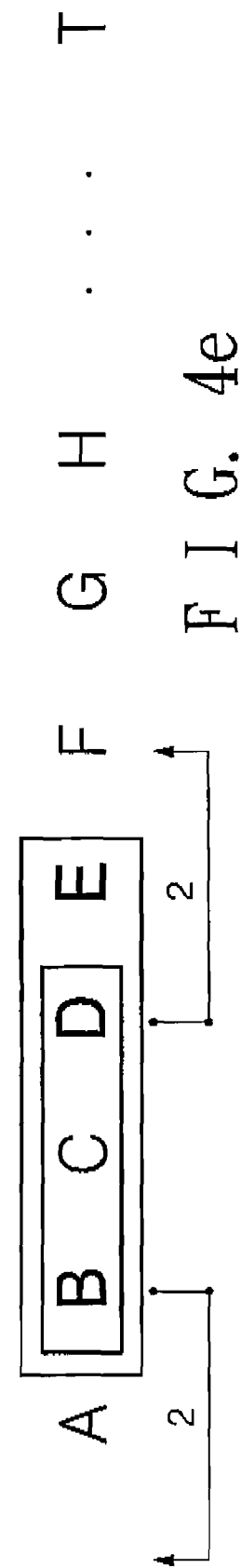

Referring to FIG. 3, during the tag pre-processing procedure, the tag pre-processing module 21 extracts the body portion of the HTML source code, i.e., the content between the tags <body> and </body> in sub-step 511. Subsequently, in sub-step 512, the tag pre-processing module 21 determines whether tags matching the first preset tag group are present in the extracted body portion. If it is determined to be yes in sub-step 512, sub-step 513 is executed to delete the character strings between the matching tags as well as the matching tags from the extracted body portion. After sub-step 513 is ended or when it is determined to be no in sub-step 512, sub-step 514 is executed. In sub-step 514, the tag pre-processing module 21 determines whether tags matching the second preset tag group are present in the extracted body portion. If it is determined to be yes in sub-step 514, sub-step 515 is executed to delete the tags matching the second preset tag group from the extracted body portion. If it is determined to be no in sub-step 514 or after sub-step 515 is ended, sub-step 516 is executed to determine whether sequences of white spaces are present in the extracted body portion. If it is determined to be yes in sub-step 516, sub-step 517 is executed, in which the tag pre-processing module 21 converts each sequence of the white spaces to a single space, so that character strings at different lines are located at the same line and are partitioned by the remaining paragraph format tags, such as <p> and </p> or <br>. If it is determined to be no in sub-step 516 or after sub-step 517 is ended, the tag pre-processing procedure is completed, and the preprocessed portion (which contains a plurality of character strings and a plurality of paragraph format tags) thus obtained through the aforesaid steps 511 to 517 is outputted to the block analyzing module 22, which will execute step 52 (see FIG. 2). It should be noted that the order of execution of the sub-steps 512, 514 may be adjusted according to design requirements, and that sub-steps 512, 514 may be executed simultaneously, without being limited to the disclosure in this embodiment.

In step 52, the block analyzing module 22 is used to calculate the length and position of each character string in the pre-processed portion received from the tag pre-processing module 21. Thereafter, in step 53, the block analyzing module 22 finds a first predetermined percentage of the character strings with the longest lengths in the pre-processed portion. In step 54, a number of position intervals between each of the character strings belonging to the first predetermined percentage of the character strings with the longest lengths and another one of the character strings belonging to the first predetermined percentage of the character strings with the longest lengths is analyzed and, when the number of position intervals is not greater than a second predetermined value, the corresponding character strings belonging to the first predetermined percentage of the character strings with the longest lengths as well as any other of the character strings in the pre-processed portion disposed therebetween are labeled as belonging to a same block. Thereafter, in step 55, a largest block is found from the block thus labeled and is outputted to the tag post-processing module 23. The first predetermined percentage is a value that is preferably any integer ranging from 3 to 15, and the second predetermined value is preferably any integer ranging from 2 to 10. In this embodiment, the first predetermined percentage and the second predetermined value are preset, In order that the aforesaid steps 53~55 can be better understood, they will be further illustrated with reference to FIGS. 4a to 4e and using the following example in which the pre-processed portion received by the block analyzing module 22 includes twenty character strings, the first predetermined percentage is 15%, and the second predetermined value is 2:

AA<p>BBBBBBBBBBBBBBB<br>CCC<br>DDDDDD DDDDDDDDD</p><p>EEEEEEEEEEEEEEEEEEE EE<br>FFFFF<br>GG<br>HHHH HHHH<br> III-IIIIIIIIII</p><p>J<br>KKK<br>LL<br>MMMM <br>N<br>OO<br>P<br>QQQ<br>R<br>S <br>TT </p>

In the example, the positions of the character strings A to T are numbered in ascending order. The character strings B, D and E belong to the first 15 percent of the character strings with the longest lengths in the pre-processed portion (see FIG. 4a). The block analyzing module 22 will analyze the character strings (i.e., character strings A, C and D) that are within two position intervals from and that precede or follow the first of the B, D and E character strings (i.e., the B character string) to find presence of other character strings which belong to the first 15 percent of the character strings with the longest lengths therefrom (see FIG. 4b). Since the number of position intervals between the character string B and the character string D is 2, which is not greater than the second predetermined value, the character strings B and D, as well as the character string C between the character strings B and D, will be labeled as belonging to the same block (see FIG. 4c). The block analyzing module 22 further analyzes the character strings (i.e., the character strings A, E and F) that are within two position intervals from and that precede or follow the block (the character strings B, C and D) thus labeled (see FIG. 4d). Since the number of position intervals between the character string D and the character string E is 1, which is less than the second predetermined value, the character strings B, C, D and E will be labeled as belonging to the same block. Thus, in the example, the block thus formed from the character strings B, C, D and E constitutes the largest block in the pre-processed portion (see FIG. 4e).

After step 55 is ended, step 56 is executed, in which the tag post-processing module 23 deletes the paragraph format tags from the largest block to obtain the main content of the HTML web page in plain text format. Subsequently, in step 57, the main content is outputted to the RSS reader 1, which displays the main content for browsing by the user in plain text page format.

In the case of the aforesaid example, the main content thus displayed will look like the following:

BBBBBBBBBB CCC DDDDDDDDDDDDDDD EEEEEEEEEEEEEEEEEEEE

As illustrated, the present invention utilizes the tag pre-processing procedure to delete the tags and character strings irrelevant to the main content from the HTML source code so as to extract a portion related to the main content of the HTML web page. Thereafter, by using the lengths of the character strings in the extracted portion and the position intervals among the character strings in the extracted portion, the largest block of the character strings in the extracted portion is found. Lastly, by deleting the remaining tags (i.e., the paragraph format tags) in the largest block, the main content of the HTML web page in plain text format can be obtained for browsing by the user. Thus, the present invention not only permits precise conversion of the main content of an HTML web page to plain text but also allows the user to quickly browse the main content of the web page.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A method for converting a target-web page to plain text, comprising the following steps:
   (A) obtaining HTML source code of the -target web page;
   (B) executing a tag pre-processing procedure to extract a body portion of the HTML source code that is related to main content of the target web page, the body portion including a plurality of character strings and a plurality of tags among the character strings;
   (C) calculating length and position of each of the character strings in the body portion of the HTML source code to find a first predetermined percentage of the character strings in the body portion with the longest lengths, the number of character strings in the first predetermined percentage of the character strings in the body portion with the longest lengths corresponding to a product of the first predetermined percentage and the number of character strings in the body portion;
   (D) analyzing a number of position intervals between each of the character strings belonging to the first predetermined percentage of the character strings with the longest lengths and another one of the character strings belonging to the first predetermined percentage of the character strings with the longest lengths, and labeling the corresponding character strings as well as any other of the character strings disposed therebetween as belonging to a same block if the number of position intervals is not greater than a second predetermined value so as to find a largest block of the character strings; and
   (E) deleting the tags among the character strings in the largest block thus formed so as to obtain the main content of the target web page.

2. The method for converting target web page to plain text according to claim 1, wherein the first predetermined percentage is a value that is an integer ranging from 3 to 15, and the second predetermined value is an integer ranging from 2 to 10.

3. The method for converting target web page to plain text according to claim 1, wherein the tags deleted in step (E) include line break tags, <br>, and opening and closing paragraph break tags, <p> and </p>.

4. A conversion system, comprising:
   a processor configured to execute a plurality of modules, the plurality of modules comprising:
   a tag pre-processing module for receiving HTML source code of target web page, said tag pre-processing module executing a tag pre-processing procedure to extract a body portion of the HTML source code that is related to main content of the target web page, the body portion including a plurality of character strings and a plurality of tags located among the character strings;
   a block analyzing module, coupled to said tag pre-processing module, for calculating length and position of each of the character strings in the body portion from said tag pre-processing module to find a first predetermined percentage of the character strings in the body portion with the longest lengths, and for analyzing a number of position intervals between each of the character strings belonging to the first predetermined percentage of the character strings with the longest lengths and another one of the character strings belonging to the first predetermined percentage of the character strings with the longest lengths, and for labeling the corresponding character strings as well as any other of the character strings disposed therebetween as belonging to a same block if the number of position intervals is not greater than a second predetermined value so as to find a largest block of the character strings, the number of character strings in the first predetermined percentage of the character strings in the body portion with the longest lengths corresponding to a product of the first predetermined percentage and the number of character strings in the body portion; and
   a tag post-processing module, coupled to said block analyzing module, for deleting the tags among the character strings in the largest block found by said block analyzing module so as to obtain the main content of the target web page.

5. The conversion system according to claim 4, wherein the first predetermined percentage is a value that is an integer ranging from 3 to 15, and the second predetermined value is an integer ranging from 2 to 10.

6. The conversion system according to claim 4, wherein the tags deleted by said tag post-processing module include paragraph and line break tags.

* * * * *